(12) United States Patent
Herley (10) Patent No.: US 7,362,918 B2
(45) Date of Patent: Apr. 22, 2008

(54) SYSTEM AND METHOD FOR DE-NOISING MULTIPLE COPIES OF A SIGNAL

(75) Inventor: Cormac Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 10/606,002

(22) Filed: Jun. 24, 2003

(65) Prior Publication Data

US 2004/0264806 A1 Dec. 30, 2004

(51) Int. Cl.
*G06K 9/36* (2006.01)
*G06T 15/40* (2006.01)
*G09G 5/00* (2006.01)
*H04N 9/74* (2006.01)

(52) U.S. Cl. ............... 382/284; 345/629; 345/421; 348/586

(58) Field of Classification Search ......... 382/282, 382/154, 284; 345/629, 421; 348/586
See application file for complete search history.

(56) References Cited

U.S. PATENT DOCUMENTS

| | | | | |
|---|---|---|---|---|
| 5,022,085 | A * | 6/1991 | Cok | 382/284 |
| 6,222,637 | B1 * | 4/2001 | Ito et al. | 358/1.18 |
| 6,366,316 | B1 * | 4/2002 | Parulski et al. | 348/239 |
| 6,556,243 | B1 * | 4/2003 | Dotsubo et al. | 348/231.2 |
| 2002/0181762 | A1 * | 12/2002 | Silber | 382/154 |
| 2003/0138137 | A1 * | 7/2003 | Bojer et al. | 382/132 |
| 2003/0202715 | A1 * | 10/2003 | Kinjo | 382/282 |

* cited by examiner

*Primary Examiner*—Jingge Wu
*Assistant Examiner*—Kathleen Yuan
(74) *Attorney, Agent, or Firm*—Lyon & Harr, LLP; Mark A. Watson (57) ABSTRACT

A "composite signal generator" automatically combines two or more copies of a signal to produce a composite that is better than the individual copies. For example, given two or more input images of a scene captured from approximately the same viewpoint, the composite signal generator automatically produces a composite image having reduced or eliminated areas of occlusion with respect to any occlusions existing in the input images. First, the input images are registered using conventional image registration techniques. Differences between the registered images are then used to identify regions of potential occlusion in one or more of the images. A determination of which image is actually occluded is made by identifying which image has a larger discontinuity along a border of the potentially occluded regions. A composite image is then created by choosing one image and mosaicing parts from the other images where it is occluded and they are not.

28 Claims, 4 Drawing Sheets

SYSTEM AND METHOD FOR DE-NOISING MULTIPLE COPIES OF A SIGNAL

BACKGROUND

1. Technical Field

The invention is related to a system for de-noising multiple copies of a signal, and in particular, to a system for automatically combining two or more partially occluded copies of an image from approximately the same viewpoint to produce a composite image that is less occluded than any of the individual copies.

2. Related Art

A mosaic image is an image that is constructed from parts of two or more images of a scene. There are a number of well known conventional schemes for mosaicing images. Typically, these conventional schemes first align or register two or more image frames of a particular scene. One or more selected image portions, represented by groups of contiguous pixels from one or more of the aligned images, are then integrated into a composite or mosaic image. Thus, the resulting mosaic is constructed as a patchwork image containing portions from two or more of the aligned image frames.

Further, in order to provide for visually seamless integration of elements from different images into the mosaic image (so that the resulting mosaic doesn't actually look like a patchwork image), a number of conventional filtering techniques are used. For example, techniques including blending, feathering or some sort of linear or non-linear weighted pixel averaging along the edge of each portion added to the mosaic are commonly used for seamlessly adding such portions to the mosaic image. There are a number of similar techniques, well known to those skilled in the art, for seamlessly adding elements to the mosaic image.

One common use for creation of mosaic images is in creating an image from a set of two or more images that includes either more or fewer elements than any of the images alone. For example, where one image of a scene includes an object not in a second image of the same scene, it may be desired to construct a mosaic image of the scene based on the second image, wherein the mosaic image includes the second image of the scene as well as the object from the first image of the scene. Conversely, it may be desired to construct a mosaic image of the scene based on the first image, wherein the mosaic image includes the first image of the scene, but does not include the object that was included in the first image of the scene. Such uses for mosaic images are well known to those skilled in the art.

Clearly, the preceding example extends to the case where an object that is occluding one part of a first image is removed by incorporating non-occluded parts of another image into the first image. While this idea is conceptually simple, implementation of the idea can be quite complex. For example, one straightforward method for creating such mosaics is simply for a user to manually select a portion from one image, then to paste it into another image. This process can be repeated as many times as desired to create a mosaic image containing the desired elements. However, this "simple" case actually requires the computational capabilities of the human mind for identifying occluding objects and selecting non-occluded portions of other images for filling in the occluded areas of a target image.

One conventional scheme simply averages a number of aligned image frames of a scene to produce a relatively non-occluded scene. However, simple image averaging tends to introduce artifacts such as "ghosting," wherein objects visible in only a relatively small number of image frames are faintly visible in the composite image.

Another conventional scheme takes the median of a number of aligned image frames to produce a relatively non-occluded scene. Or alternatively, selects the most common value at each location when considering the aligned image frames collectively. In this way a portion of the scene that is not occluded in a majority of the aligned image frames will be selected, and any region that is occluded in only a minority of the aligned image frames will be replaced by a portion from one of the non-occluded images. Several variations on these schemes where individual aligned image frames essentially "vote" to determine which frames contain occluded and which contain non-occluded data are possible. Unfortunately, such voting does not work unless the non-occluded aligned images are in a majority at every location of the scene. For example, in the case where only two aligned image frames are available, and their difference indicates non-negligible occlusion in at least one of them, neither the median nor the most common value approach can identify which frame is occluded.

Other methods involve "background subtraction" type techniques for subtracting one image from another, following image alignment or registration, for identifying areas of difference between the image frames. Given an otherwise static scene, it is probable that that any occluding objects will be located within the identified areas of difference. However, determining which of the identified areas of difference between the images actually includes an occluding object, and which does not is a significantly more complex problem.

For example, a number of automatic schemes have been proposed or implemented for identifying occluding objects in image frames. These schemes include methods for automatically modeling a sequence of images, such as a video sequence, using a layered representation for segmenting images into individual components. These individual components can then be used to create mosaic images, or even mosaic video sequences. For example, having identified the individual components of an image sequence, they can then be used in combination with other image frames from the sequence to remove those components or objects from the image sequence, thereby removing an "occlusion" from the scene. Alternately, such objects can simply be inserted into image frames of another image sequence, thereby overlaying, or occluding, the scene represented by that image sequence.

In general, the basic idea of such schemes is to isolate or identify a particular object or objects within a sequence of images using some sort of motion model for detecting movement of objects between image frames, then to decompose that image sequence into a number of layers, with each layer representing either an object or a background image over the entire image sequence. Such layered objects are commonly referred to as "sprites." These sprites can then be inserted or extracted from particular image frames to create a desired mosaic effect.

However, learning "sprites" from an image sequence is a difficult task because there are typically an unknown number of objects in the image sequence, those objects typically have unknown shapes and sizes, and they must be distinguished from the background, other sprites, sensor noise, lighting noise, and significant amounts of deformation. Further, unless the frames of the image sequence are closely temporally related, or there are a sufficiently large number of image frames, it becomes difficult or impossible to identify objects through the use of motion models. Consequently, such schemes are not typically useful in cases involving limited numbers of image frames, or where those image frames may have been captured at different times, or sufficiently far apart in time such that the use of temporal motion models is ineffective for identifying objects or "sprites" in the images.

In addition, other conventional schemes for identifying objects within an image sequence make use of specialized models for identifying particular types of objects, such as, for example, a car, a truck, a human head, a ball, an airplane, etc. Models designed for identifying one particular type of object within an image sequence are typically ineffective for identifying other types of objects. Further, such models typically operate best as the number of image frames increase, and as the objects within the image frames exhibit some observable motion from frame to frame. Therefore, in the case of limited image sequences, such as, for example where there are only two images, such schemes are often unable to determine whether a portion of one image is actually an occlusion of the scene, or simply a part of the scene.

Still other conventional image modeling schemes for identifying elements within an image sequence include techniques for probabilistic pattern analysis and pattern classification for identifying elements within an image sequence. Such schemes tend to be computationally expensive, and again, they tend to operate poorly in the case of limited input images, such as the case where it is necessary to decide which of two images includes an occlusion, and which of the two images does not.

Consequently, what is needed is a system and method for identifying occlusions in limited sets of images. Further such a system and method should be capable of operating independently of any temporal relationships or motions of objects between the images. In addition, such a system and method should be capable of determining whether any portion of a single image of a scene, identified as being different from another image of the same scene, is occluded by simply analyzing that identified portion of the single image by itself. Finally, such a system and method should be capable of automatically removing identified occlusions by creating a mosaic image using non-occluded portions from two or more images to create the mosaic image.

SUMMARY

A "composite signal generator," as described herein automatically combines two or more copies of a signal to produce a composite or "mosaic" signal that is better than the individual copies. For example, given an image set of as few as two images of a scene captured from approximately the same viewpoint, the composite signal generator automatically produces a composite image having reduced or eliminated areas of occlusion with respect to any occlusions existing in the input images. Further, this automatic elimination of occlusions in an image is accomplished without the need to consider any temporal relationships or motions of objects between the images. In fact, once any areas of difference between the images are identified, an automatic determination of whether such areas represent occluded areas or non-occluded areas is made by analyzing each image individually. This information is then used for automatically generating a mosaic or composite image having reduced or eliminated areas of occlusion relative to any of the input images.

In general, the composite signal generator operates by first aligning or registering a set of two or more images of a scene. During alignment of the images, conventional image registration techniques, including, for example, translation, rotation, scaling, and perspective warping of the images are used to align the images. Consequently, it is not necessary to capture each image from the exact same viewpoint or camera orientation. However, providing images from approximately the same viewpoint is useful for reducing or eliminating image artifacts that might otherwise be visible in the composite image.

Further, in one embodiment, conventional image color or gray balancing techniques are used to ensure that corresponding pixels of each image of scene are as close as possible to the same color or intensity value. These balancing techniques include histogram averaging and white balancing (e.g. color balancing), for example, among others. Such techniques are well known to those skilled in the art, and will not be described in detail herein.

Once the image registration and balancing processes have been completed, the images are then compared to identify areas of difference between two or more of the images. Assuming perfect image registration and color or intensity balancing, a direct pixel-by-pixel comparison of the images will identify all areas of difference between the images. In a related embodiment, an average of nearby pixels is compared, rather than comparisons on an individual pixel-by-pixel basis. Further, in another related embodiment, uncertainties or small errors in the registration and image balancing processes are addressed by performing a block-by-block comparison of corresponding image pixels, rather than of individual pixels. In particular, in this embodiment, corresponding pixel blocks are compared between images, using a predefined similarity threshold, to determine whether corresponding blocks of pixels are approximately the same between any two or more registered images. In a tested embodiment, pixel blocks on the order of about seven-by-seven pixels were found to produce good results in comparing the similarity of images to identify areas of difference.

The areas of difference between the registered images are then used to create an image mask that identifies regions of potential occlusion in one or more of the images, such regions being defined by groups of one or more contiguous blocks of pixels. Those areas of all images not covered by the mask are identified as not being occluded. Further, in a related embodiment, where a comparison of pixel blocks indicates a match of more than a predetermined percentage of corresponding pixel blocks, then the matching blocks are identified as not being occluded, and any non-matching blocks are identified as being occluded. For example, assuming a 75-percent matching threshold, where four out of five corresponding blocks match, then that block will be identified as not being occluded for each of the four images, and the corresponding block that does not match in the fifth image will be identified as being occluded. Clearly, in the case where this percentage is set to 100-percent, all blocks must match to be identified as not being occluded. Note that this particular embodiment offers the advantage of reduced computational complexity, at the cost of potentially missing some actually occluded areas.

Next, for any remaining blocks that are identified in the image mask as being part of potentially occluded regions, a determination is then made as to whether they actually represent occlusions in particular images. For example, in determining whether potentially occluded areas in each image are actually occluded, it is assumed that any actual occlusion will have relatively well defined edges, or other detectable discontinuities, in the region of the potential occlusion relative to the background scene. The image mask is then updated for each image for which such a determination is made for a particular potentially occluded region to indicate that the region is either actually occluded, or not occluded for that image.

In making the determination as to whether a particular image is actually occluded, the pixels close to the border of each potential area of occlusion are examined to identify pixel color or intensity discontinuities perpendicular to those edges. Note that there is no need to examine blocks in the interior of such regions; only regions close to the boundary need be examined, but of course the boundary of the potential occlusion can have an irregular shape. There are a number of conventional techniques for identifying such discontinuities, such as, for example, conventional edge detection processes which are expressly designed to detect such discontinuities. If such discontinuities exceed a predetermined threshold along the border of a potentially occluded region, then that area in the current image is identified as occluded. Otherwise that area is identified as not being occluded. Alternately, a determination of which image is actually occluded is made by comparing the levels of discontinuity in two or more images for a particular potentially occluded region. Then, the image having a larger amount of discontinuity along the border of the potentially occluded region is identified as the image containing the occlusion.

The next step is to actually construct the composite image, using the image mask as a starting point. For example, in one embodiment, a user interface is provided for selecting a starting image (or "seed image") from which occlusions are to be removed in the composite image. Alternately, an image is either chosen randomly from the set of images, or is chosen as having more matching blocks than any other image. Regardless of how the seed image is chosen, the composite image is grown from the seed image by automatically replacing occluded areas from the seed image with non-occluded areas from one or more of the other images.

Note that it is not necessary to examine every potentially occluded region in every image in order to construct the composite image having reduced or eliminated areas of occlusion. For example, in constructing the composite image, the first step is to use the image mask to determine which regions of pixel blocks represent potentially occluded regions in the seed image, as described above. Each such region in the seed image is dealt with in turn. In particular, a determination of whether each region in the seed image is actually occluded is first made, as described above. If the region is not actually occluded, then the image mask is updated for that image. However, if it is determined that the region is occluded, then the corresponding regions in the remaining images in the set are examined, in turn, to identify one that is not occluded. The first non-occluded matching region that is identified is used to replace the occluded region in the seed image. In an alternate embodiment, all of the matching regions are examined to find the region having the lowest level of discontinuity, as described above, with that matching region then being used to replace the corresponding region in the seed image.

This process repeats until all of the potentially occluded regions in the seed image have either been identified as not being occluded, or have simply been replaced with matching non-occluded regions from other images. At this point, the composite has been fully constructed. However, as noted above, in order to provide for visually seamless integration of regions from different images into the composite image, the regions are blended, feathered, averaged, etc., to provide an apparent seamless pasting of the region into the composite.

In addition to the just described benefits, other advantages of the system and method for automatically creating a composite image for eliminating occlusions in an image of a scene will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
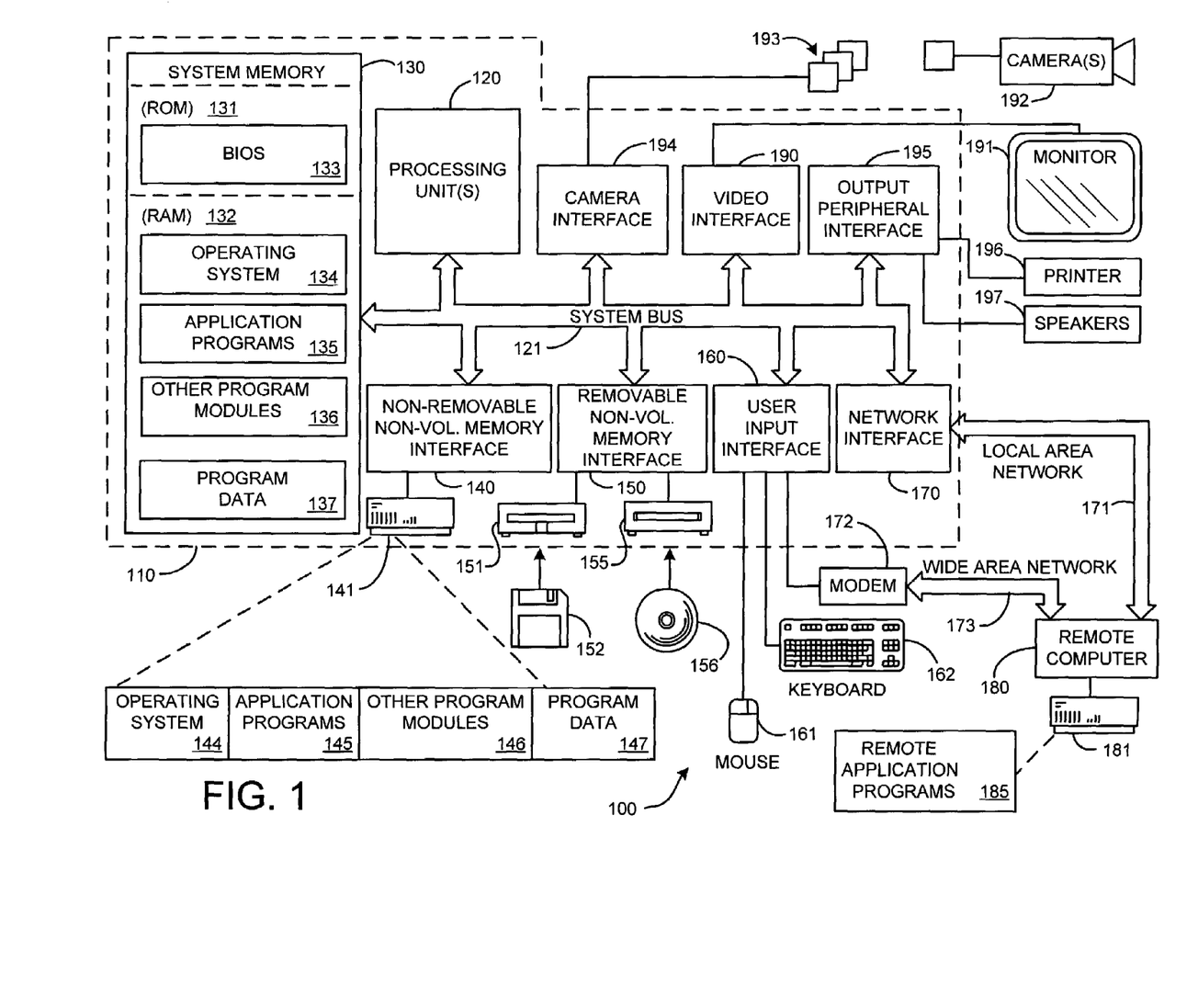
FIG. 1 is a general system diagram depicting a general-purpose computing device constituting an exemplary system for providing seamless multiplexing of encoded bitstreams.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The aforementioned term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "composite signal generator."

2.0 Introduction

In general, a "composite signal generator," as described herein, automatically combines two or more copies of a signal to produce a composite or "mosaic" signal that is better than the individual copies. For example, one might have several images of a famous monument, but be unable to capture an image of the scene which does not have one or more areas of occlusion due to people wandering in and out of the image frame. The composite signal generator addresses such problems, and more, by creating a composite signal from a set of input signals.

For example, given an image set of as few as two images of a scene captured from approximately the same viewpoint, the composite signal generator automatically produces a composite image having reduced or eliminated areas of occlusion with respect to any occlusions existing in the input images. Further, this automatic elimination of occlusions in an image is accomplished without the need to consider any temporal relationships or motions of objects between the images. In fact, once any areas of difference between the images are identified, an automatic determination of whether such areas represent occluded areas or non-occluded areas is made by analyzing each image individually. This information is then used for automatically generating a mosaic or composite image having reduced or eliminated areas of occlusion relative to any of the input images by forming a composite image from non-occluded regions of the input images.

2.1 System Overview

The composite signal generator described herein provides a system and method for automatically generating a composite image of a scene from a set of two or more images of the scene. The resulting composite image has reduced or eliminated areas of occlusion relative to the images in the set. The composite is generated by first aligning or registering the images. Once registered, the images are compared to identify areas of potential occlusion. One or more of the individual images are then analyzed to determine whether the areas of potential occlusion are actually occluded. Next, one image is selected as a seed image for creating the composite by replacing regions of actual occlusion in the seed image with corresponding regions from other images in the set that are identified as being non-occluded regions.

2.2 System Architecture

Figure 2:
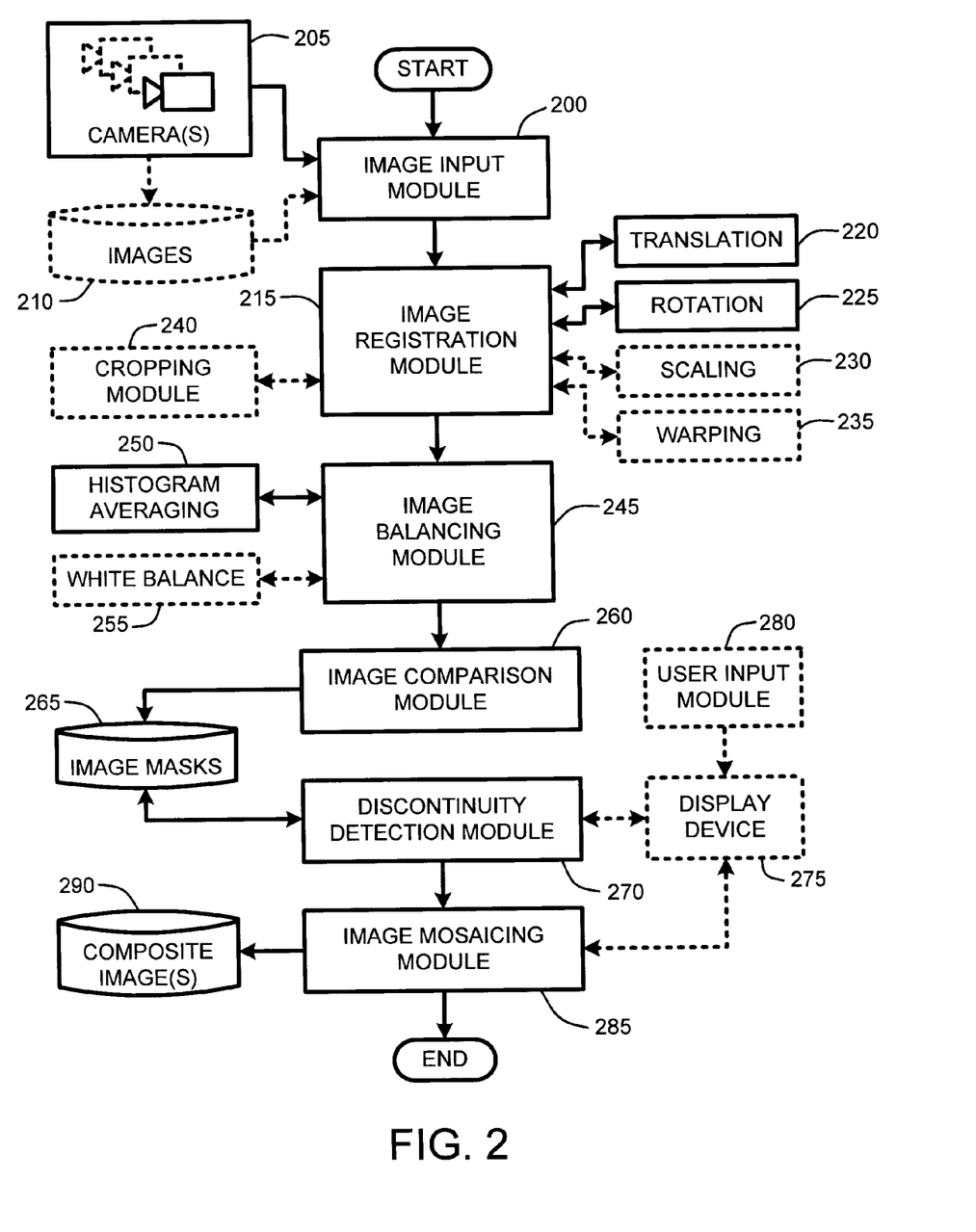
FIG. 2 illustrates an exemplary architectural diagram showing exemplary program modules for automatically generating a composite image from a set of images of a scene.

The general system diagram of FIG. 2 illustrates the processes summarized above. In particular, the system diagram of FIG. 2 illustrates the interrelationships between exemplary program modules for implementing a composite signal generator for creating a mosaic image of a scene represented by a set of images, wherein the mosaic image has reduced or eliminated areas of occlusion relative to the each of the images in the set. It should be noted that the boxes and interconnections between boxes that are represented by broken or dashed lines in FIG. 2 represent alternate embodiments of the composite signal generator methods described herein, and that any or all of these alternate embodiments, as described below, may be used in combination with other alternate embodiments that are described throughout this document.

As illustrated by FIG. 2, the composite signal generator uses an image input module 200 to input a set of two or more images of a scene. This set of images is then used for automatically generating a mosaic image as described below. In one embodiment, the image input module 200 retrieves the input images directly from one or more still or video digital cameras 205 using conventional techniques. Alternately, in another embodiment, the image input module 200 reads the input images from a database or directory 210 of images. Further, in yet another embodiment, both of these embodiments are combined so that a portion of the input images are obtained from one or more cameras 205, and the rest of the input images are retrieved from the database 210.

Once the set of input images has been retrieved by the image input module 200, the images are provided to an image registration module 215. The image registration module 215 then uses a combination of conventional image alignment techniques to register the images. These image alignment techniques include any combination of image translation 220, image rotation 225, image scaling 230, and image warping 235 for registering the images. Further, in one embodiment, a cropping module 240 is provided to crop the perimeter of the images. In particular, when translating, rotating, scaling or warping images for registering those images, it is likely that the outer edges of the images will not include the same information, especially where two or more of the images were captured from slightly different viewpoints or magnifications. Therefore, to account for such areas along the perimeter of the images, the cropping module 240 crops one or more of the images, as needed, so that each of the images includes the same viewpoint, from edge to edge, as each other image.

Next, an image balancing module 245 is used for balancing or equalizing the registered images. In general, the image balancing module 245 normalizes the images with respect to intensity or color. In other words, areas in common are equalized, along with the rest of the image, so that they exhibit approximately the same color, intensity, brightness and contrast levels. As described below, noted below, there are a number of conventional techniques for accomplishing this equalization, such as, for example, histogram equalization 250 and white balancing 255, among others. As a result of this equalization, each image will have color or intensity values for corresponding pixels that are approximately equivalent to each other image, even if each of the images were taken under differing lighting conditions.

Following image equalization, the next step is to compare the registered and equalized images via an image comparison module 260. The image comparison module 260 compares each of the images in the set to identify areas or regions of contiguous pixels that are potentially occluded. Identification of potential occlusion is accomplished by simply identifying areas or regions wherein the images of the scene differ from one another. In alternate embodiments, as described in Section 3.1.3, the comparisons are accomplished either as pixel-by-pixel comparisons of the images, comparisons of pixel averages around each pixel, or comparisons of blocks of pixels. In each case, these comparisons use a predefined or user adjustable similarity threshold for determining whether the pixels match, or whether they are different.

Once these areas of difference have been identified, they are then used to create an image mask 265 that identifies regions of potential occlusion in one or more of the images, with these regions being defined by groups of one or more contiguous pixels or blocks of pixels. Those areas of all images not covered by the mask 265 are identified as not being occluded. Further, in a related embodiment, where a comparison of pixel blocks indicates a match of more than a predetermined percentage of corresponding pixel blocks, then the matching blocks are identified as not being occluded, and any non-matching blocks are identified as being occluded.

Next, a discontinuity detection module 270 makes a determination as to whether particular regions of potential occlusion are actually occluded. The discontinuity detection module 270 makes this determination by examining the pixels close to the border of each potential area of occlusion to identify pixel color or intensity discontinuities perpendicular to those edges (See Section 3.1.3). If such discontinuities exceed a predetermined threshold along the border of a potentially occluded region, then that area in the current image is identified as occluded. Otherwise that area is identified as not being occluded. Alternately, a determination of which image is actually occluded is made by comparing the levels of discontinuity in two or more images for a particular potentially occluded region. Then, the image having a larger amount of discontinuity along the border of the potentially occluded region is identified as the image containing the occlusion.

Alternately, in one embodiment, the discontinuity detection module 275 displays the regions of potential occlusion via a conventional display device 275 to allow for user determination or override of whether particular regions are actually occluded via a user input module 280. For example, the user may want a particular occlusion, such as, for example, a known person in front of a monument, to be included in the final composite image, while all other occlusions are removed. Therefore, user identification of a particular region as either non-occluded, or occluded, will cause that region to either be included, or excluded, respectively, from the final composite image.

Finally, given the image mask 265, known areas of occlusion and non-occlusion, an image mosaicing module 285 patches together non-occluded regions, beginning with a base or "seed" image to create the composite image 290. Further, as described in Section 3.1.4, in order to provide for visually seamless integration of regions from different images into the composite image 290, in one embodiment, the process of pasting non-occluded regions into occluded regions of the seed image includes some type of blending, feathering, or pixel averaging along the edge of the region which is being inserted into the seed image.

3.0 Operation Overview

The above-described program modules are employed in a seamless multiplexer for automatically multiplexing and demultiplexing embedded bitstreams. This process is depicted in the flow diagrams of FIGS. 7 and 8 following a detailed operational discussion of exemplary methods for implementing the aforementioned programs modules.

3.1 Operational Elements

The following sections describe in detail the operational elements for implementing the composite signal generator methods using the processes summarized above in view of FIG. 2. In general, the composite signal generator techniques described herein address the problem of creating a non-occluded image, or an image having reduced areas of occlusion relative to a set of images of a scene.

3.1.1 Image Registration

Image registration is a conventional process for aligning two or more images of the same scene. Typically, one image, called the base image, is considered the reference to which the other images, called input images, are compared. The purpose of image registration is to bring each input image into alignment with the base image by applying a spatial transformation to each of the input images. Such spatial transformations include translations, rotations, warping and scaling, either individually or in any combination. Image registration techniques are well known to those skilled in the art, and will be described only generally in the following paragraphs.

As noted above, the composite signal generator operates by first aligning or registering a set of two or more images of a scene. During alignment of the images, conventional image registration techniques, including, for example, translation, rotation, scaling, and perspective warping of the images are used to align the images. Consequently, it is not necessary to capture each image from the exact same viewpoint or camera orientation. However, providing images from approximately the same viewpoint is useful for reducing or eliminating image artifacts that might otherwise be visible in the resulting composite image.

3.1.2 Image Balancing

Once the image registration has been completed, areas of the scene in common to each image are used to normalize the images. In other words, areas in common are equalized, along with the rest of the image, so that they exhibit approximately the same color, intensity, brightness and contrast levels. As noted below, there are a number of conventional techniques for accomplishing this equalization, such as, for example, histogram equalization and white balancing, among others. However, any conventional equalization technique may be used. Again, as such image balancing techniques are well known to those skilled in the art, those techniques will be described only generally in the following paragraphs.

For example, histogram equalization is a popular conventional technique in image processing that is typically used to eliminate or reduce inconsistency in the uniformity of the exposure and tone of a digital image. In general, histogram equalization can be used to stretch or compress the brightness of the pixels making up an image based on the overall distribution of pixel brightness levels in the image. This equalization process tends to produce a more balanced, realistic looking image having an extended dynamic range and more uniform exposure and tone characteristics.

A traditional histogram equalization process involves creating a count of the number of pixels exhibiting a particular pixel brightness level (also known as the luminous intensity value) in an image. From this count, a cumulative distribution function is computed and normalized to a maximum value corresponding to the number of pixel brightness levels employed. The cumulative distribution function is then used as a lookup table to map from the original pixel brightness levels to final levels. Further, applying the same histogram equalization techniques to two or more images of the same scene is useful for ensuring that the corresponding pixels comprising the images are as close as possible to the same value.

Similarly, white balancing (or color balancing) is another well known conventional technique for ensuring that an image has a consistent color palette. In particular, in traditional RGB color imaging, images are white-balanced by viewing a white or gray target under the operational lighting conditions and adjusting the gain of each imaging channel until the intensities of the white region are equal in the red, green, and blue color planes. Once this balance is set, the appearance of the other colors in the image will closely match the perception of color by the human eye.

Therefore, in the context of the composite signal generator, a white or gray target area common to each of the images is selected. The images are then individually white balanced with respect to that target for each image. As a result of proper white balancing, each image will have color values for corresponding pixels that are approximately equivalent to each other image, even if each of the images were taken under differing lighting conditions. The selection of a white or gray target in the images is accomplished using conventional methods for searching the images to identify such white or gray targets common to each of the images. Such techniques are well known to those skilled in the art, and will not be described in detail herein.

3.1.3 Image Comparison and Identification of Occlusions

Once the image registration and balancing processes have been completed, the images are then compared to identify areas of difference between two or more of the images. Assuming perfect image registration and color or intensity balancing, a direct pixel-by-pixel comparison of the images will identify all areas of difference between the images. In a related embodiment, an average of nearby pixels is compared for each pixel, rather than comparisons on an individual pixel-by-pixel basis. Further, in another related embodiment, uncertainties or small errors in the registration and image balancing processes are addressed by performing a block-by-block comparison of corresponding image pixels, rather than of individual pixels. In particular, in this embodiment, corresponding pixel blocks are compared between images, using a predefined similarity threshold, to determine whether corresponding blocks of pixels are approximately the same between any two or more registered images. In a tested embodiment, pixel blocks on the order of about seven-by-seven pixels were found to produce good results in comparing the similarity of images to identify areas of difference.

Regardless of how the areas of difference between the registered images are identified, those areas are then used to create an image mask that identifies regions of potential occlusion in one or more of the images, such regions being defined by groups of one or more contiguous blocks of pixels. Those areas of all images not covered by the mask are identified as not being occluded. Further, in a related embodiment, where a comparison of pixel blocks indicates a match of more than a predetermined percentage of corresponding pixel blocks, then the matching blocks are identified as not being occluded, and any non-matching blocks are identified as being occluded. For example, assuming a 75-percent matching threshold, where four out of five corresponding blocks match, then that block will be identified as not being occluded for each of the four images, and the corresponding block that does not match in the fifth image will be identified as being occluded. Clearly, in the case where this percentage is set to 100-percent, all blocks must match to be identified as not being occluded. Note that this particular embodiment offers the advantage of reduced computational complexity, at the cost of potentially missing some actually occluded areas.

Next, for any remaining blocks that are identified in the image mask as being part of potentially occluded regions, a determination is then made as to whether they actually represent occlusions in particular images. For example, in determining whether potentially occluded areas in each image are actually occluded, it is assumed that any actual occlusion will have relatively well defined edges, or other detectable discontinuities, in the region of the potential occlusion relative to the background scene. However, than making this determination for every such region before constructing the composite image, in one embodiment, the determination is done on as as-needed basis, as described below in Sectoion 3.1.4. The image mask is then updated for each image for which such a determination is made for a particular potentially occluded region to indicate that the region is either actually occluded, or not occluded for that image.

In making the determination as to whether a particular image is actually occluded, the pixels close to the border of each potential area of occlusion are examined to identify pixel color or intensity discontinuities perpendicular to those edges. Note that there is no need to examine blocks in the interior of such regions; only regions close to the boundary need be examined, but of course the boundary of the potential occlusion can have an irregular shape. There are a number of conventional techniques for identifying such discontinuities, such as, for example, conventional edge detection processes which are expressly designed to detect such discontinuities. If such discontinuities exceed a predetermined threshold along the border of a potentially occluded region, then that area in the current image is identified as occluded. Otherwise that area is identified as not being occluded. Alternately, a determination of which image is actually occluded is made by comparing the levels of discontinuity in two or more images for a particular potentially occluded region. Then, the image having a larger amount of discontinuity along the border of the potentially occluded region is identified as the image containing the occlusion.

Note that in a related embodiment, a record is kept of which pixel blocks match in which images. Consequently, following this comparison, this record will also indicate whether particular regions of pixels or pixel blocks match between two or more images. Given this information, a determination of whether a particular region is either occluded or non-occluded in one image is automatically extended to all other images having matching regions. As a result, it is not necessary to identify discontinuities in all regions in all images in order to identify which of those regions are occluded, so long as the determination is made for one matching region.

3.1.4 Constructing a Mosaic or Composite Image

In general, image mosaicing is a process whereby separate portions from two or more images are 'joined' together into a single composite image. Before images can be mosaiced, they must be registered so that a given section in one image corresponds to the same section in another image. Typically, this registration is accomplished by some geometric transformation, such as the registration processes described above.

Once the registration, balancing and identification of potential regions of occlusion have been completed, then the next step is to actually construct the composite image, using the image mask as a starting point along with one of the images that is used as a "seed image" for beginning construction of the mosaic. In one embodiment, a user interface is provided for selecting a starting image (or "seed image") from which occlusions are to be removed in the composite image. Alternately, an image is either chosen randomly from the set of images, or is chosen as having more matching blocks than any other image. Regardless of how the seed image is chosen, the composite image is grown from the seed image by automatically replacing occluded areas from the seed image with non-occluded areas from one or more of the other images.

In constructing the composite image, the first step is to use the image mask to determine which regions of pixel blocks represent potentially occluded regions in the seed image, as described above. Each such region in the seed image is dealt with in turn. In particular, a determination of whether each region in the seed image is actually occluded is first made, as described above. If the region is not actually occluded, then the image mask is updated for that image. However, if it is determined that the region is occluded, then the corresponding regions in the remaining images in the set are examined, in turn, to identify one that is not occluded. The first non-occluded matching region that is identified is used to replace the occluded region in the seed image. Consequently, because the first identified non-occluded region is selected for replacing corresponding occluded regions, it is likely that not all of the potentially occluded regions will be examined. However, in an alternate embodiment, all of the matching regions in the other images are examined to find the region having the lowest level of discontinuity, as described above, with that matching region then being used to replace the corresponding region in the seed image.

This process repeats until all of the potentially occluded regions in the seed image have either been identified as not being occluded, or have simply been replaced with matching non-occluded regions from other images. At this point, the composite has been fully constructed. However, in order to provide for visually seamless integration of regions from different images into the composite image, in one embodiment, the process of pasting non-occluded regions into occluded regions of the seed image includes some type of blending, feathering, or pixel averaging along the edge of the region which is being inserted into the seed image. Such techniques are well known to those skilled in the art, and will not be described in detail herein.

3.2 System Operation

Figure 3:
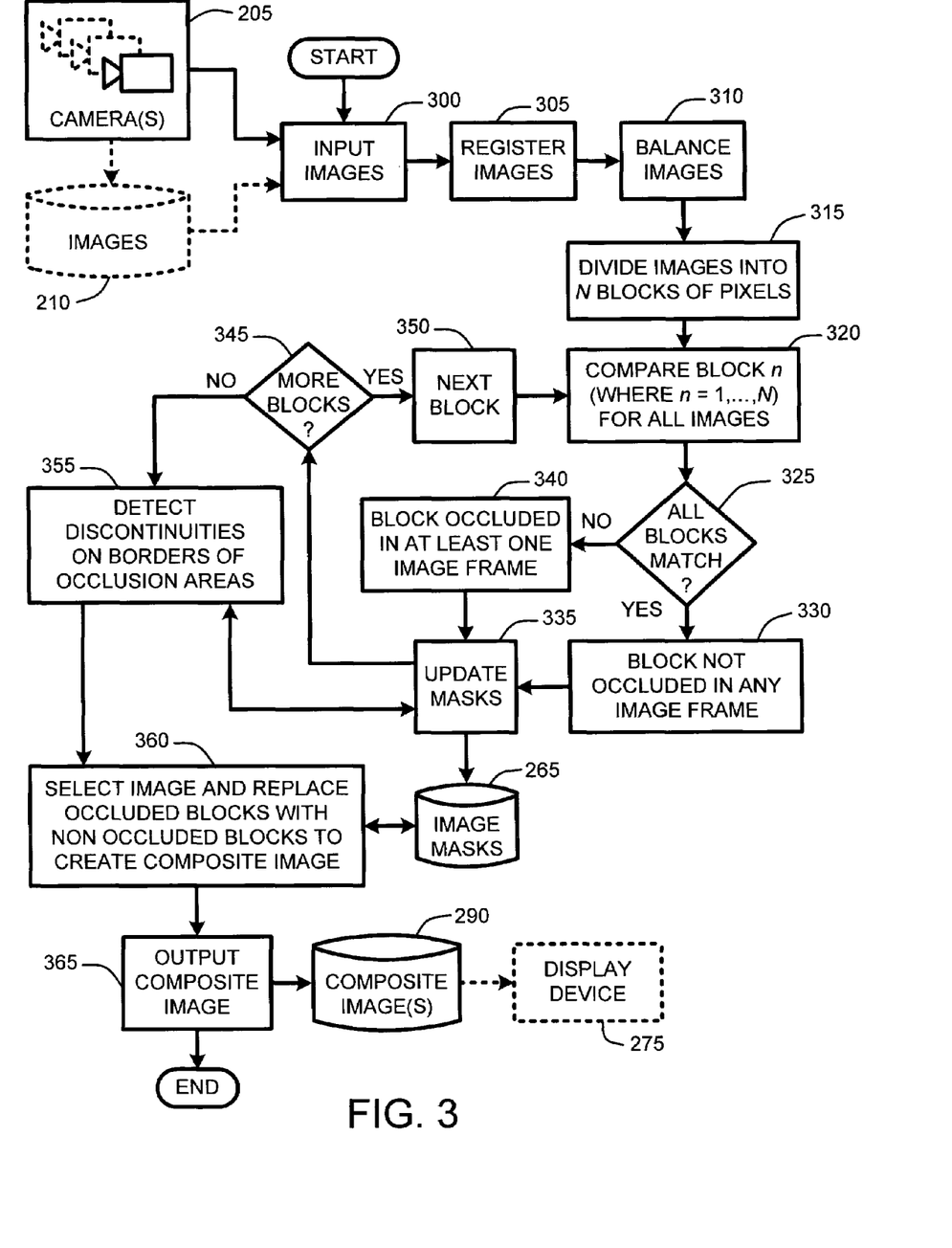
FIG. 3 illustrates an exemplary system flow diagram for automatically generating a composite image from a set of images of a scene.

The program modules described in Section 2.2 with reference to FIG. 2, and in view of the detailed description provided in Section 3.1, are employed for automatically combining copies of a signal to produce a composite that is better than any of the individual copies. This process is depicted by FIG. 3 which illustrates an exemplary embodiment of the system flow diagram for automatically generating a composite image from a set of images of a scene. It should be noted that the boxes and interconnections between boxes that are represented by broken or dashed lines in FIG. 3 represent alternate embodiments of the composite signal generator, and that any or all of these alternate embodiments, as described below, may be used in combination.

Referring now to FIG. 3 in combination with FIG. 2, the process can be generally described as a system for eliminating occlusions from a set of images of a scene by creating a mosaic image from that set. In particular, as illustrated by FIG. 3, operation of the composite signal generator begins by inputting 300 a set of two or more images of a scene from either or both digital still or video cameras 205, or from images stored in a database or directory 210 of images.

After inputting 300 the set of images, those images are then registered 305 using a combination of conventional image alignment techniques, including, for example, one or more of: image translation, image rotation, image scaling, image warping, and image cropping. Next, the registered images are balanced or equalized 310 to normalize the images with respect to intensity or color. This image equalization or balancing 310 is accomplished using conventional techniques, including, for example, histogram equalization, and white balancing. As a result of this equalization, each image will have color or intensity values for corresponding pixels that are approximately equivalent to each other image, even if each of the images were taken under differing lighting conditions.

Once the images have been registered 305 and balanced 310, the images are divided into a number N of pixel blocks 315. Corresponding pixel blocks are then compared 320 one block at a time for all images. In other words, where there are M images, then pixel block n in image 1 will have corresponding pixel blocks in each of images 2 through M. Comparison of these M pixel blocks 320 is used to determine whether all pixel blocks corresponding to block n match 325. Note that as described above, in one embodiment, this comparison includes a similarity threshold for determining whether particular blocks of pixels match.

If all of the blocks match in all of the M images for block n, then block n is identified as not being occluded in any image frame 330. Alternately, if all blocks do not match 325, then that block is identified as being occluded in at least one image frame. This information, i.e., the current block being non-occluded 330, or the current block being occluded in at least one image frame 340, is then used to update 335 an image mask 265 for identifying which blocks are either non-occluded, or potentially occluded. After each block is compared 320 and the results used to update 335 the image mask 265, the block count n is incremented, and if there are more blocks 345 to examine, then the next block is selected 350 for comparison 320. These steps repeat until all corresponding blocks in all images have been compared, and the image mask is 265 is completed for the current image set.

After the last block has been compared, then the next step is to use the image mask 265 to identify contiguous pixel blocks that are potentially occluded, then to determine whether those regions are actually occluded. This determination is accomplished by examining the regions of potentially occluded pixel blocks by detecting discontinuities 355 along the borders of those regions. If no discontinuities are detected, or the discontinuities are below a predetermined threshold, for a particular image along the borders of a particular potentially occluded region, then the image mask 265 is updated 335, with respect to that image, to indicate that the region in question is not occluded. Alternately, if a discontinuity above the threshold is identified within that region, then the image mask 265 is updated 335, with respect to that image, to indicate that the region in question is occluded.

Note that in the embodiment described above, a determination is made as to whether each potentially occluded region in each image is actually occluded before construction of the composite image. However, in view of the alternate embodiments described above in Section 3.1.3, it is clear that not all regions need be examined individually to determine whether they are occluded. Further, it is also clear that in the alternate embodiments described above, rather than determining whether the regions are occluded before constructing the composite image, that determination is made during construction of the composite image, on an as needed basis.

Regardless of when the determination of whether particular regions are actually occluded is made, the next step is actually to create the composite image. As described above, this process begins using the image mask 265, along with a seed image to create the composite image 290. As described above, creation of the composite image is accomplished by selecting the seed image 360 and replacing any occluded pixel blocks or regions of pixel blocks with corresponding non-occluded blocks from one or more other images in the set to create the composite image. Further, as described in Section 3.1.4, in order to provide for visually seamless integration of regions from different images into the composite image 290, in one embodiment, the process of replacing occluded blocks with non-occluded pixel blocks includes some type of blending, feathering, or pixel averaging along the edge of the region which is being added to the composite image. Finally, once the composite image has been completed, it is output 365 and stored 290 for later use, as desired. For example, in one embodiment, the composite image is output to a conventional display device 275.

3.3 Implementation within a Digital Camera

It should be noted that the processes described above are explained in terms of a computing device for implementing the program modules embodying the composite signal generator. Consequently, it should be appreciated by those skilled in the art that the processes described above can be implemented completely within a digital camera. In particular, in one embodiment, by including the aforementioned program modules along with a computer processor module within the digital camera, the digital camera is then provided with the capability to construct an image mosaic for reducing or eliminating occlusions in a composite image. Note that this creation of a composite image or mosaic is accomplished in near real-time, using the system and methods described herein, within the digital camera as soon as the set of images has been captured, and that set is designated for processing by the user.

3.4 Pictorial Illustration of Operation of the Composite Signal Generator

FIG. 4A through FIG. 9 provide a pictorial representation of the processes described above for constructing a composite image without occlusions existing in a set of input images.

Figure 4A:
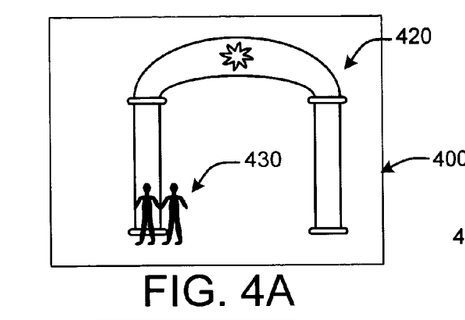
FIGS. 4A and 4B illustrate a pictorial representation of a sequence of image frames having areas of occlusions.
Figure 4B:
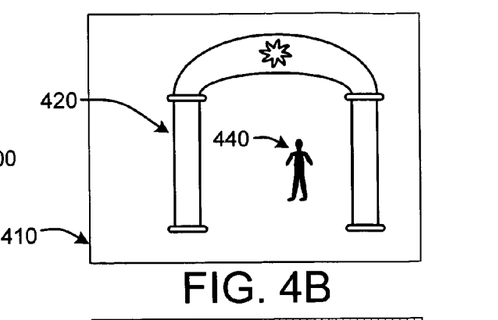

In particular, as FIGS. 4A and 4B illustrate two images 400 and 410, respectively, forming a set of image frames from which a composite image is to be constructed. As illustrated by FIG. 4A, image frame 400 illustrates an arch 420 that is partially occluded by two people 430. Similarly, as illustrated by FIG. 4B, image frame 410 illustrates the arch 420, with a background of the image frame being partially occluded by a third person 440.

Figure 5A:
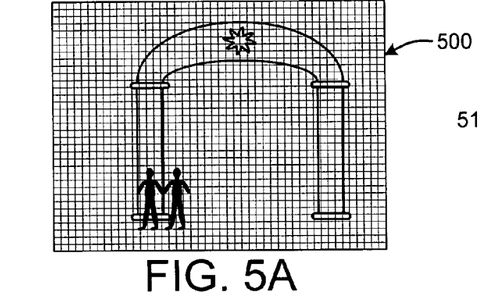
FIGS. 5A and 5B illustrate the image frames of FIGS. 4A and 4B, respectively, showing the image frames being divided into pixel blocks for comparison to identify areas of potential occlusions in the image frames.
Figure 5B:
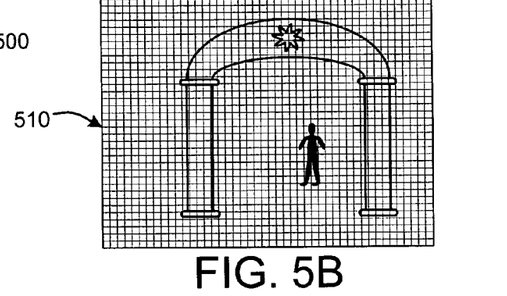
Figure 6:
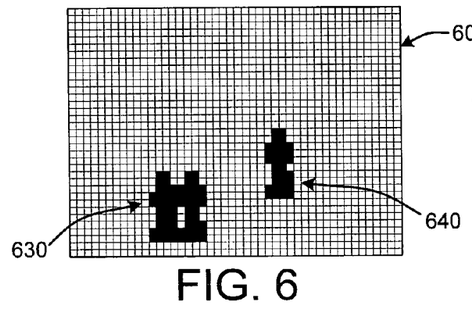
FIG. 6 illustrates an image mask showing areas of potential occlusions in the image frames of FIGS. 4A and 4B.

The images 410 and 420 of FIGS. 4A and 4B, respectively, are divided into blocks of pixels as illustrated by grids 500 and 510 of FIGS. 5A and 5B, respectively. Corresponding blocks of pixels are then compared to create an image mask 600 as illustrated by FIG. 6. This image mask 600 illustrates two distinct areas of difference between the images, i.e., the people in FIGS. 4A and 4B, which represent regions of potential occlusion 630 and 640, respectively.

Figure 7:
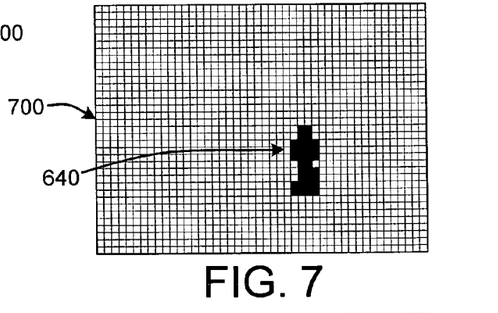
FIG. 7 illustrates an updated image mask showing an identified area of occlusion in FIG. 4B.

Selecting image frame 410 of FIG. 4B and determining which of the regions of potential occlusion 630 and 640 are actually occluded results in an updated image mask 700 for image frame 410 as illustrated by FIG. 7. In other words, in accordance with the processes described above, the only actual occlusion that will be identified in the image frame 410 of FIG. 4B will result from the person 440 in that image.

Figure 8:
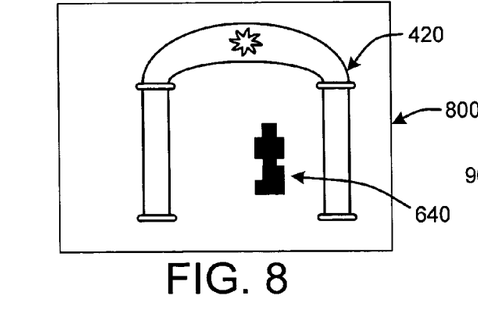
FIG. 8 illustrates the identified area of occlusion of FIG. 6B overlaid on the image frame of FIG. 4B.
Figure 9:
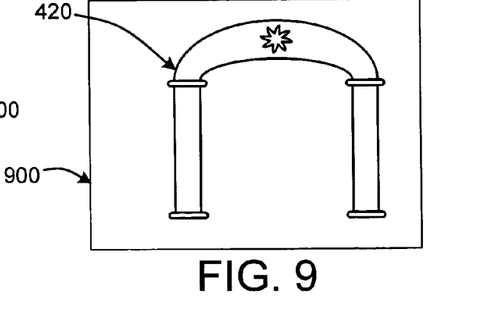
FIG. 9 illustrates a composite image having the occlusions of FIG. 4A and FIG. 4B removed.

FIG. 8 illustrates the image frame 410 of FIG. 4B, along with the pixel blocks that are actually occluded in that image frame. The composite image, as illustrated by FIG. 9 is then created by replacing the occluded pixel blocks, illustrated in FIG. 8, with corresponding pixel blocks from image frame 400 of FIG. 4A.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A physical computer-readable medium having stored thereon computer executable instructions for automatically constructing an image mosaic from a set of images of a scene, said computer executable instructions comprising:
    inputting a set of images of a scene;
    registering the set of images;
    comparing the set of images to identify areas of difference between the images for all images, said areas of difference representing regions of potential occlusion in each image, wherein an occlusion represents an area in any of the images that is at least partially obstructed from view by one or more objects in one or more of the other images;
    determining, for each image, whether regions of potential occlusion in each image represent actual regions of occlusion, or whether the regions of potential occlusion in each image represent regions of non-occlusion, by determining a level of discontinuity along an exterior border of each region of potential occlusion in each image; and creating a mosaic image by replacing at least one actual region of occlusion in one image from the set of images with corresponding regions of non-occlusion from at least one other image from the set of images of the scene.

2. The computer-readable medium of claim 1 wherein registering the images comprises at least one of translating the images, rotating the images, scaling the images and warping the images, for aligning the images.

3. The computer-readable medium of claim 1 further comprising cropping the images after registering the set of images so that all images cover approximately the same view of the scene.

4. The computer-readable medium of claim 1 further comprising balancing the set of images.

5. The computer-readable medium of claim 4 wherein balancing the images comprises histogram averaging of the images based on corresponding targets for each image.

6. The computer-readable medium of claim 4 wherein balancing the images comprises white balancing the images based on corresponding targets for each image.

7. The computer-readable medium of claim 1 wherein comparing the set of images to identify areas of difference between the images for all images further comprises comparing corresponding blocks of image pixels between each image to determine whether the corresponding blocks match.

8. The computer-readable medium of claim 1 wherein comparing the set of images to identify areas of difference between the images for all images further comprises automatically constructing at least one image mask for identifying non-occluded regions and regions of potential occlusion in the set of images.

9. The computer-readable medium of claim 7 determining whether the corresponding blocks match further comprises determining whether the corresponding blocks match within a predetermined matching threshold.

10. The computer-readable medium of claim 1 wherein replacing at least one actual region of occlusion in one image from the set of images with corresponding regions of non-occlusion further comprises at least one of blending, feathering, and pixel averaging, along the edge of the corresponding regions of non-occlusion used to replace any actual regions of occlusion.

11. The computer-readable medium of claim 1 further comprising a user interface for excluding one or more actual regions of occlusion from being replaced with corresponding regions of non-occlusion.

12. A system for removing occlusions from a composite image formed from a set of images of a scene, comprising:
acquiring at least two images of a scene from approximately the same viewpoint;
aligning each of the images to a base image selected from the set of images;
identifying areas of potential occlusion in each of the aligned images, wherein an occlusion represents an area in any of the images that is at least partially obstructed from view by one or more objects in one or more of the other images;
selecting a seed image from the set of images;
determining whether each area of potential occlusion in the seed image is an actual area of occlusion by examining each area of potential occlusion in the seed image to determine whether a level of discontinuity along an outer edge of each area of discontinuity exceeds a predetermined threshold;
replacing areas of actual occlusion in the seed image with corresponding non-occluded areas from one of the other images in the set to form a composite image from the seed image.

13. The system of claim 12 wherein the system is embedded in a digital camera.

14. The system of claim 12 wherein aligning each of the images to the base images comprises applying a geometric transform to each image relative to the base image for registering each of the images to the base image.

15. The system of claim 14 further comprising individually cropping each image so that all images cover approximately the same view of the scene.

16. The system of claim 12 further comprising balancing the images by applying any of histogram averaging of the images based on corresponding targets for each image, and white balancing of the images based on corresponding targets for each image.

17. The system of claim 12 wherein identifying areas of potential occlusion in each of the aligned images further comprises dividing each image in the set of images into a number of pixel blocks, and comparing corresponding pixel blocks between each image to determine whether the corresponding blocks match within a predetermined threshold.

18. The system of claim 12 wherein identifying areas of potential occlusion in each of the aligned images further comprises a pixel-by-pixel comparison of corresponding pixels between each image to determine whether the corresponding pixels match within a predetermined threshold.

19. The system of claim 12 wherein identifying areas of potential occlusion in each of the aligned images further comprises automatically constructing an image mask for identifying all regions of potential occlusion in the set of images.

20. The system of claim 12 wherein replacing areas of actual occlusion in the seed image with corresponding non-occluded areas from one of the other images in the set further comprises at least one of blending, feathering, and pixel averaging an outer edge of the corresponding non-occluded areas with respect to the seed image.

21. A computer-implemented process for removing occlusions from a mosaic image created from a set of images of a scene, comprising:
inputting a set of two or more images of a scene;
aligning each of the images to a base image selected from the set of images;
comparing each of the aligned images to identify areas of potential occlusion in each of the aligned images, wherein an occlusion represents an area in any of the images that is at least partially obstructed from view by one or more objects in one or more of the other images;
determining a level of discontinuity along an outer edge of each area of potential occlusion for each image, said level of discontinuity indicating an area of actual occlusion where the level of discontinuity exceeds a predetermined discontinuity threshold, and said level of discontinuity indicating an area of non-occlusion where the level of discontinuity is less than the predetermined discontinuity threshold;
creating an image mask for each image, said image masks indicating areas of occlusion and areas of non-occlusion for each image; and
using the image mask for each image for creating a mosaic image by replacing areas of actual occlusion in one of the images with corresponding areas of non-occlusion from one of the other images.

22. The computer-implemented process of claim 21 wherein the computer is integral to a digital camera, and wherein the composite image is formed automatically from images of a scene captured using the digital camera.

23. The computer-implemented process of claim 21 wherein replacing areas of actual occlusion in one of the images with corresponding areas of non-occlusion from one of the other images further comprises blending pixels along an outer edge of the corresponding areas of non-occlusion with pixels surrounding the areas of actual occlusion being replaced.

24. The computer-implemented process of claim 21 wherein replacing areas of actual occlusion in one of the images with corresponding areas of non-occlusion from one of the other images further comprises feathering pixels along an outer edge of the corresponding areas of non-occlusion with pixels surrounding the areas of actual occlusion being replaced.

25. The computer-implemented process of claim 21 wherein replacing areas of actual occlusion in one of the images with corresponding areas of non-occlusion from one of the other images further comprises averaging pixels along an outer edge of the corresponding areas of non-occlusion with pixels surrounding the areas of actual occlusion being replaced.

26. The computer-implemented process of claim 21 further comprising balancing the set of images after registering the set of images.

27. The computer-implemented process of claim 26 wherein balancing the images comprises histogram averaging of the images based on corresponding targets for each image.

28. The computer-implemented process of claim 26 wherein balancing the images comprises white balancing the images based on corresponding targets for each image.

\* \* \* \* \*